US012227819B2

(12) United States Patent
Wang

(10) Patent No.: US 12,227,819 B2
(45) Date of Patent: Feb. 18, 2025

(54) METHOD AND APPARATUS FOR RECOVERING COPPER, BRONZE AND LEAD FROM MIXTURE OF COPPER OXIDE, TIN OXIDE AND LEAD OXIDE

(71) Applicant: PUKYONG NATIONAL UNIVERSITY INDUSTRY—UNIVERSITY COOPERATION FOUNDATION, Busan (KR)

(72) Inventor: Jei Pil Wang, Busan (KR)

(73) Assignee: PUKYONG NATIONAL UNIVERSITY INDUSTRY-UNIVERSITY COOPERATION FOUNDATION, Busan (KR)

( * ) Notice: Subject to any disclaimer, the term of this patent is extended or adjusted under 35 U.S.C. 154(b) by 696 days.

(21) Appl. No.: 17/436,031

(22) PCT Filed: Mar. 5, 2019

(86) PCT No.: PCT/KR2019/002525
§ 371 (c)(1),
(2) Date: Sep. 2, 2021

(87) PCT Pub. No.: WO2020/179943
PCT Pub. Date: Sep. 10, 2020

(65) Prior Publication Data
US 2022/0002837 A1    Jan. 6, 2022

(30) Foreign Application Priority Data
Mar. 5, 2019    (KR) ........................ 10-2019-0025107

(51) Int. Cl.
C22B 5/12    (2006.01)
C22B 7/00    (2006.01)
(Continued)

(52) U.S. Cl.
CPC ................ *C22B 5/12* (2013.01); *C22B 7/001* (2013.01); *C22B 13/02* (2013.01); *C22B 25/02* (2013.01)

(58) Field of Classification Search
CPC ........... C22B 5/12; C22B 7/009; C22B 7/001; C22B 13/02; C22B 13/025; C22B 15/0006; C22B 25/02
See application file for complete search history.

(56) References Cited

U.S. PATENT DOCUMENTS 1,515,616 A * 11/1924 Poppenhusen .......... C22B 7/001
75/693
2016/0201164 A1    7/2016 Oishi et al.

FOREIGN PATENT DOCUMENTS

JP           09291307         11/1997
KR         20160110842         9/2016
(Continued)

OTHER PUBLICATIONS

Yoo et al. ("Kinetics of the Volatilization Removal of Lead in Electric Arc furnace dust" Materials Transactions, vol. 46. 2005 p. 323-339). (Year: 2005).*

(Continued)

*Primary Examiner* — Ricardo D Morales
(74) *Attorney, Agent, or Firm* — NORTON ROSE FULBRIGHT US LLP

(57) ABSTRACT

A method and an apparatus for recovering copper, bronze and lead by allowing methane gas to flow into a reactor and heat-treating a mixture of copper oxide, tin oxide and lead oxide under a temperature condition of 700-900° C. is disclosed. The method includes placing a mixture of copper oxide, tin oxide and lead oxide in a reactor, increasing the temperature inside the reactor, and allowing a reductive gas to flow into the reactor so as to heat-treat the mixture.

10 Claims, 9 Drawing Sheets

(51) Int. Cl.
  *C22B 13/02* (2006.01)
  *C22B 25/02* (2006.01)

(56) References Cited

FOREIGN PATENT DOCUMENTS

| KR | 101820606 | 1/2018 | | |
|----|-----------|--------|---|---|
| KR | 101820606 B1 * | 1/2018 | ............. | C22B 15/00 |

OTHER PUBLICATIONS

International Search Report and Written Opinion issued in Corresponding PCT Application No. PCT/KR2019/002525, dated Dec. 4, 2019 (English translation provided).
Jung, Woo-chul. *A Study of the Recovery of Valuable Materials from Photovoltaic Ribbon of Spent Solar Module*. 2016. Pukyoug National University, Thesis.

* cited by examiner

METHOD AND APPARATUS FOR RECOVERING COPPER, BRONZE AND LEAD FROM MIXTURE OF COPPER OXIDE, TIN OXIDE AND LEAD OXIDE

This application is a national phase under 35 U.S.C. § 371 of International Application No. PCT/KR2019/002525, filed Mar. 5, 2019, which claims the benefit of priority to Korean Patent Application No. 10-2019-0025107, filed Mar. 5, 2019, the entire contents of each of which are hereby incorporated by reference in their entirety.

FIELD

The present disclosure relates to a method and an apparatus for recovering copper, bronze and lead from a mixture of copper oxide, tin oxide and lead oxide. More specifically, the present disclosure relates to a method and an apparatus for recovering copper, bronze and lead including introducing methane gas into a reactor, and heat-treating a mixture of copper oxide, tin oxide and lead oxide under a temperature condition of 700° C. to 900° C.

DESCRIPTION OF RELATED ART

As the need for solar power generation has emerged, an amount of installation of a solar power module has increased exponentially. However, the solar power module has raised social and environmental problems due to waste solar power modules according to a life expectancy of the solar power module.

A lifespan of an existing solar power module is estimated to be about 30 years or longer. However, an actual life expectancy of a solar power module is calculated to be about 15 years due to damage during installation, transportation, or disaster.

That is, an average lifespan of a solar power module is expected to be approximately 15 to 20 years. When the life expectancy is estimated to be 15 years and assuming that 1 MW is 100 t, amounts of the waste solar power modules that are expected to occur worldwide in 2020 year and 2025 year are 139,380 t and 1,679,190 t, respectively. The amount is expected to increase exponentially.

Further, when the average lifespan of the solar power modules distributed in Korea is estimated to be 15 years. In 2020 and 2025, about 499 t and 12,655 t of waste modules will be estimated to occur. The waste module amount is expected to increase exponentially from 2023.

Currently, we are concentrating only on increase of solar power generation facilities and technology development thereof. Thus, there is lack of interest in waste module treatment and resource recovery.

Heavy metals and harmful substances including lead are included in the solar power module. Thus, when the solar power module is incinerated or buried, considerable environmental pollution occurs, and a treatment cost thereof is also estimated to be huge.

SUMMARY OF THE INVENTION

One purpose of the present disclosure is to provide a method for recovering copper, bronze and lead from a mixture of copper oxide, tin oxide and lead oxide.

Another purpose of the present disclosure is to provide an apparatus for recovering copper, bronze and lead from a mixture of copper oxide, tin oxide and lead oxide.

One aspect of the present disclosure provides a method for recovering copper, bronze and lead from a mixture of copper oxide, tin oxide and lead oxide, the method comprising: placing a mixture of copper oxide, tin oxide and lead oxide into a reactor; raising a temperature inside the reactor; and introducing reductive gas into the reactor and heat-treating the mixture.

In one implementation of the method, the reductive gas includes methane gas. In one implementation of the method, the heat-treatment is carried out at 700° C. to 900° C.

In one implementation of the method, raising the temperature includes introducing nitrogen or argon gas into the reactor.

In one implementation of the method, the reactor contains a mesh structure therein, wherein the mixture of copper oxide, tin oxide and lead oxide is placed on a top face of the mesh structure, wherein a recovering unit for recovering molten material is disposed below the mesh structure.

In one implementation of the method, the molten material includes molten copper-tin alloy.

In one implementation of the method, in the heat-treatment of the mixture, at least one of an inertial force, an impact force or a rotational force is applied to the mixture or the reactor.

In one implementation of the method, the at least one of the inertial force, the impact force or the rotational force is applied to the mixture or the reactor 10 times for 1 minute to 3 minutes.

In one implementation of the method, a recovering line for recovering vaporized lead is connected to an upper end of the reactor, and the method further includes recovering the lead using the recovering line.

In one implementation of the method, recovering the lead using the recovering line includes: cooling and depositing the vaporized lead; dust-collecting a portion of lead not deposited in the depositing step; and recovering a portion of lead not dust-collected in the dust-collecting step.

In one implementation of the method, the cooling and depositing step is performed one or more times.

In one implementation of the method, the mixture of the copper oxide, tin oxide and lead oxide is obtained by burning a waste solar power module.

Another aspect of the present disclosure provides an apparatus for recovering copper, bronze and lead from a mixture of copper oxide, tin oxide and lead oxide, the apparatus comprising: a reactor into which reductive gas is introduced; a mesh structure disposed inside the reactor, wherein a mixture of copper oxide, tin oxide and lead oxide is placed on a top face of the mesh structure; a recovering unit disposed below the mesh structure; a heater for heating an inside of the reactor; and a recovering line connected to an upper end of the reactor for recovering vaporized lead inside the reactor.

In one implementation of the apparatus, the reductive gas includes methane gas. In one implementation of the apparatus, the heater heats the inside of the reactor to a temperature range of 700° C. to 900° C.

In one implementation of the apparatus, nitrogen or argon gas is introduced into the reactor.

In one implementation of the apparatus, the apparatus further comprises: a pressing device for applying an impact force or an inertial force to the mixture or the reactor; and a rotating device for rotating the reactor.

In one implementation of the apparatus, the pressing device applies the impact force or the inertial force to the mixture or the reactor 10 times for 1 to 3 minutes, wherein the rotating device rotates the reactor 10 times for 1 minute to 3 minutes.

In one implementation of the apparatus, the recovering line includes: at least one condenser for depositing the vaporized lead; a dust-collector connected in series to the condenser for dust-collecting a portion of lead not deposited using the condenser; and a scrubber connected in series to the dust-collector for recovering a portion of lead not dust-collected using the dust-collector. In one implementation of the apparatus, a cooling plate is disposed inside the condenser.

The method of recovering copper, bronze and lead from a mixture of copper oxide, tin oxide and lead oxide according to the present disclosure introduces methane gas into the reactor, performing the heat-treatment of the mixture of copper oxide, tin oxide and lead oxide under the temperature condition of 700° C. to 900° C., and further applying inertial force, impact force and rotational force to the mixture or the reactor to recovers copper, bronze and lead therefrom. The method does not use any substances harmful to the environment, thereby reducing a production cost. The method may be relatively simple, so that the method may be relatively easily commercialized.

DETAILED DESCRIPTION

Figure 1:
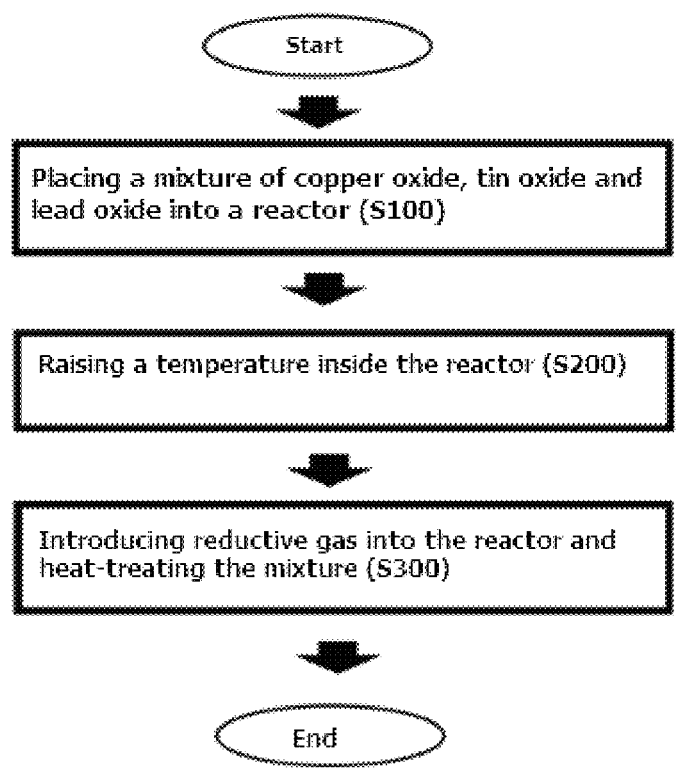
FIG. 1 is a schematic diagram showing one embodiment of the present disclosure.

The terminology used herein is for the purpose of describing uniticular embodiments only and is not intended to be limiting of the present disclosure. As used herein, the singular forms "a" and "an" are intended to include the plural forms as well, unless the context clearly indicates otherwise. It will be further understood that the terms "comprises", "comprising", "includes", and "including" when used in this specification, specify the presence of the stated features, integers, operations, elements, and/or components, but do not preclude the presence or addition of one or greater other features, integers, operations, elements, components, and/or portions thereof.

Unless otherwise defined, all terms including technical and scientific terms used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

A method of recovering copper, bronze and lead from a mixture of copper oxide, tin oxide and lead oxide according to the present disclosure may include a step S100 of placing a mixture of copper oxide, tin oxide and lead oxide into a reactor; a step S200 of raising a temperature inside the reactor; and a step S300 of introducing reductive gas into the reactor and heat-treating the mixture.

First, the step S100 of placing the mixture of copper oxide, tin oxide and lead oxide into the reactor is performed. In this connection, the mixture of copper oxide, tin oxide and lead oxide may be obtained by burning a waste solar power module. The disclosure is not limited thereto.

Specifically, the reactor includes a mesh structure therein. The mixture of copper oxide, tin oxide and lead oxide is placed on a top face of the mesh structure. Further, a recovering unit for recovering molten material is disposed below the mesh structure.

The molten material is produced in the heat-treatment step as described later, and includes copper-tin alloy.

Next, the step S200 of raising the temperature inside the reactor is performed.

Specifically, it is preferable to raise the temperature inside the reactor until the temperature reaches 700° C. to 900° C. as a temperature condition under which all of copper oxide, tin oxide and lead oxide may be reduced. In the step S200 of increasing the temperature, nitrogen or argon gas may be introduced into the reactor in a rate of 300 cc/min to maintain an inert atmosphere.

As described above, introducing the nitrogen or argon gas as an inert gas in the step S200 of increasing the temperature may allow oxygen in the reactor may be removed therefrom when raising the temperature.

Further, the nitrogen or argon gas as an inert gas may be introduced even when lowering the temperature inside the reactor.

Subsequently, the step S300 of introducing the reductive gas into the reactor and heat-treating the mixture is performed. In this connection, it is most preferable that the reductive gas be methane gas, which allows the copper oxide, tin oxide, and lead oxide to be reduced. In particular, the methane gas reacts with residual oxygen in the reactor to continuously remove oxygen such that an oxidation reaction of the lead does not occur.

Further, the heat-treatment step S300 is preferably performed at 700° C. to 900° C., whereby the copper of the mixture is reduced and remains on a top face of the mesh structure, and portions of the copper oxide and tin oxide are converted to the copper-tin alloy which is melt, flows through the mesh structure to a bottom of the reactor, and is recovered in the recovering unit, so that copper and bronze may be separated from each other.

That is, the mixture of copper oxide, tin oxide, and lead oxide may be placed on the top face of the mesh structure, and then heat-treating the inside of the reactor at a temperature of 700° C. to 900° C. may be performed under a methane gas atmosphere. Thus, at the temperature, the solid copper, and molten copper-tin alloy (bronze) may be separated from each other.

Therefore, it is preferable that a melting point of the mesh structure is higher than a temperature at which the copper-tin alloy is melted.

In one example, the step S300 of the heat-treatment may include applying at least one of inertial force, impact force and rotational force to the mixture or the reactor, such that a larger amount of the molten copper-tin alloy of the mixture may be separated from the solid copper.

Specifically, the inertial force and impact force may be applied to the mixture or the reactor (that is, the mesh structure) 10 times for 1 minute to 3 minutes using a pressure device such as a hydraulic cylinder.

In another example, a rotation device such as a rotational motor may be used for the reactor to apply the rotational force thereto 10 times for 1 to 3 minutes.

Accordingly, the larger amount of the copper-tin alloy may flow to the bottom using the inertial force, the impact force and the rotational force, so that copper and bronze may be more effectively separated from each other.

In one example, after placing the mixture of copper oxide, tin oxide and lead oxide on the top face of the mesh structure, heat-treating the inside of the reactor at a temperature of 700° C. to 900° C. under the methane gas atmosphere may be performed, such that the lead oxide is reduced to the lead which in turn is vaporized.

Specifically, in the heat-treatment step S300, the lead oxide has a significantly higher vapor pressure than that of each of the copper oxide and tin oxide in an entire temperature region of 700° C. to 900° C., so that the lead is vaporized in the temperature range. Having the higher vapor pressure means that it is easy to break an attraction force between molecules under a certain condition, and thus a boiling point of the lead is lowered and the leads evaporates easily.

Therefore, it is preferable that the recovering line for recovering the vaporized lead is connected to a top of the reactor.

In this connection, the step of recovering the lead through the recovering line may include cooling and depositing the vaporized lead; dust-collecting lead not deposited in the deposition step; and recovering the lead not dust-collected in the dust-collecting step.

First, the vaporized lead moves to the upper end or the top of the reactor, and then is discharged to an outside of the reactor through the recovery line connected to the upper end of the reactor. Thereafter, a step of moving the vaporized lead to a device such as a condenser having a cooling plate to cool and deposit the vaporized lead is performed.

In this connection, the step of depositing may be performed one or more times, such that the vaporized lead may be efficiently recovered.

Thereafter, the step of dust-collecting the lead not deposited in the deposition step is performed. The undeposited lead may be recovered by dust-collecting one more time using a dust-collector connected in series to the condenser.

Finally, the method may proceed with the step of recovering the lead that has not been dust-collected in the step of the dust-collecting. This step may be performed using a scrubber connected in series to the dust-collector. Finally, the lead may be recovered, thereby preventing a trace amount of lead from being discharged to the atmosphere.

Figure 2:
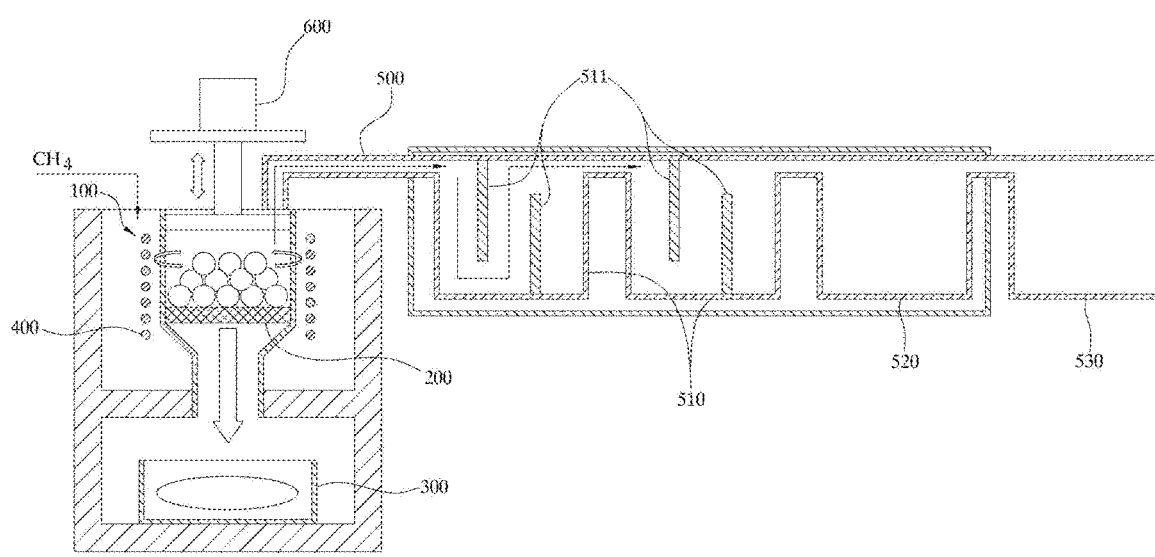
FIG. 2 is a diagram showing an apparatus for implementing one embodiment of the present disclosure.

In one example, referring to FIG. 2, an apparatus for recovering copper, bronze and lead from a mixture of copper oxide, tin oxide and lead oxide according to another embodiment of the present disclosure may include a reactor 100, a mesh structure 200, a recovering unit 300, a heater 400 and a recovering line 500.

The reductive gas is introduced into the reactor 100, and the mesh structure is received therein, so that a mixture of copper oxide, tin oxide and lead oxide may be disposed on the top face of the mesh structure.

Further, the heater 400 for heating the inside of the reactor 100 is received inside the reactor 100. The recovering line 500 is connected to an upper end thereof, so that lead vaporized by heating inside the reactor 100 may be discharged to the outside.

In this connection, it is most preferable that the methane gas as the reductive gas flows into the reactor 100. The methane gas allows the copper oxide, tin oxide and lead oxide to be reduced. In particular, the methane gas may react with the residual oxygen in the reactor 100 to continuously removes oxygen so that the oxidation reaction of the lead does not occur.

Further, while the temperature of the reactor 100 is increased using the heater 400, nitrogen or argon gas as an inert gas may be introduced into the reactor 100 at an amount of 300 cc/min to remove the oxygen inside the reactor 100 when the temperature is increased.

Further, the nitrogen or argon gas as an inert gas may be introduced even when the temperature of the inside of the reactor 100 is lowered.

The mesh structure 200 is disposed inside the reactor 100, and a mixture of copper oxide, tin oxide, and lead oxide is placed on a top face of the structure 200. Further, the recovering unit 300 capable of recovering molten material due to the heat of the heater 400 is disposed below the structure 200.

The mixture of the copper oxide, tin oxide and lead oxide is heat-treated in the presence of the methane gas inside the reactor 100 to produce a molten copper-tin alloy. Therefore, copper of the mixture of the copper oxide, tin oxide and lead oxide is reduced and remains on the top face of the mesh structure 200, and portions of the copper oxide and tin oxide constitute the copper-tin alloy which is melt and flows through the mesh structure 200 to the bottom and gathers in the recovering unit. That is, copper and bronze may be separated from each other using the mesh structure 200.

The recovering unit 300 is disposed below the mesh structure 200, and serves to recover the molten copper-tin alloy.

The heater 400 heats the inside of the reactor 100, and may be disposed in the inside of the reactor 100 and may be embodied in a form of a heating coil. In this connection, the heater 200 preferably heats the inside of the reactor 100 to 700° C. or higher and 900° C. or lower.

When the temperature of the inside of the reactor 100 is lower than 700° C., a recovery rate of the molten material is low. When it exceeds 900° C., the copper reduced from the copper oxide may melt. Therefore, it is most preferable that the heater 400 heats the inside of the reactor 100 to 700° C. or higher and 900° C. or lower.

The recovering line 500 is connected to the upper end of the reactor 100, and may recover the lead vaporized inside the reactor 100 and at the same time discharge the lead vaporized inside the reactor 100 to the outside.

Specifically, the recovering line 500 may include one or more condensers 510, a dust-collector 520 and a scrubber 530.

The condenser 510 is configured for depositing the vaporized lead discharged from the reactor 100. One or more condensers may be connected in series to each other. At least one cooling plate 511 is provided inside the condenser 510, so that the vaporized lead may be liquefied and deposited and recovered.

The dust-collector 520 is connected in series to the condenser 510, and dust-collects the lead that has not been deposited on the condenser 510 to further recover the lead.

The scrubber 530 is connected in series to the dust-collector 520, and finally recovers the lead that is not dust-collected in the dust-collector 520, and thus prevents a trace amount of lead from being released into the atmosphere.

Therefore, the apparatus according to the present disclosure may recover the vaporized lead, as well as may prevent the lead from scattering into the atmosphere, thereby achieving an environmentally friendly effect.

In one example, the apparatus for recovering the copper, bronze and lead according to the present disclosure may further include a pressing device 600 and a rotating device.

The pressing device 600 is configured for applying an impact force or inertial force to the mixture or the reactor 100, and may include, for example, a pressure device such as a hydraulic cylinder.

Specifically, the pressing device 600 may apply an impact force or inertial force 10 times for 1 minute to 3 minutes to the mixture or the mesh structure 200 inside the reactor 100. Thus, the larger amount of the molten material, that is, the copper-tin alloy flows to the bottom of the reactor due to the inertial force and impact force, so that the copper and bronze may be separated from each other more effectively.

In particular, it is most preferable to apply the impact force or inertial force at a temperature of 900° C. 10 times for 2 minutes. This is because a larger amount of bronze is melted at a temperature of 900° C., and further, when the impact or inertia force is applied thereto 10 times for 2 minutes, the copper and bronze may not be compressed, and thus the copper and bronze may be effectively separated from each other.

Although not shown in FIG. 2, the rotating device is configured for rotating the reactor 100 and thus applying the rotational force to a waste ribbon electrode. For example, a rotating motor may be used as the rotating device.

The rotating device also applies the rotational force to the reactor 100 10 times for 1 to 3 minutes, so that the larger amount of the molten material, that is, the molten copper-tin alloy flows to the bottom of the reactor due to the rotational force, so that the copper and bronze may be separated from each other more effectively.

In particular, it is most preferable to rotate the reactor 100 10 times for 2 minutes under the temperature condition of 900° C. This is because a large amount of the copper-tin alloy is melted at a temperature of 900° C., and, further, when the rotational force is applied thereto 10 times for 2 minutes, sufficient rotational force is applied to the mixture, such that the copper and bronze may be effectively separated from each other.

Hereinafter, the method and the apparatus for recovering copper, bronze and lead according to the present disclosure will be described in more detail based on specific examples.

Experimental Example 1

A waste ribbon battery having a copper base material and coated with lead-tin alloy was placed on a top face of the mesh structure according to the present disclosure. Then, while nitrogen gas was introduced into the reactor at an amount of 300 cc/min, the temperature inside the reactor was increased. Thereafter, methane gas was introduced into the reactor, and the heat-treatment was performed for 1 hour under temperature conditions at 700° C., 800° C. and 900° C., respectively.

Figure 3:
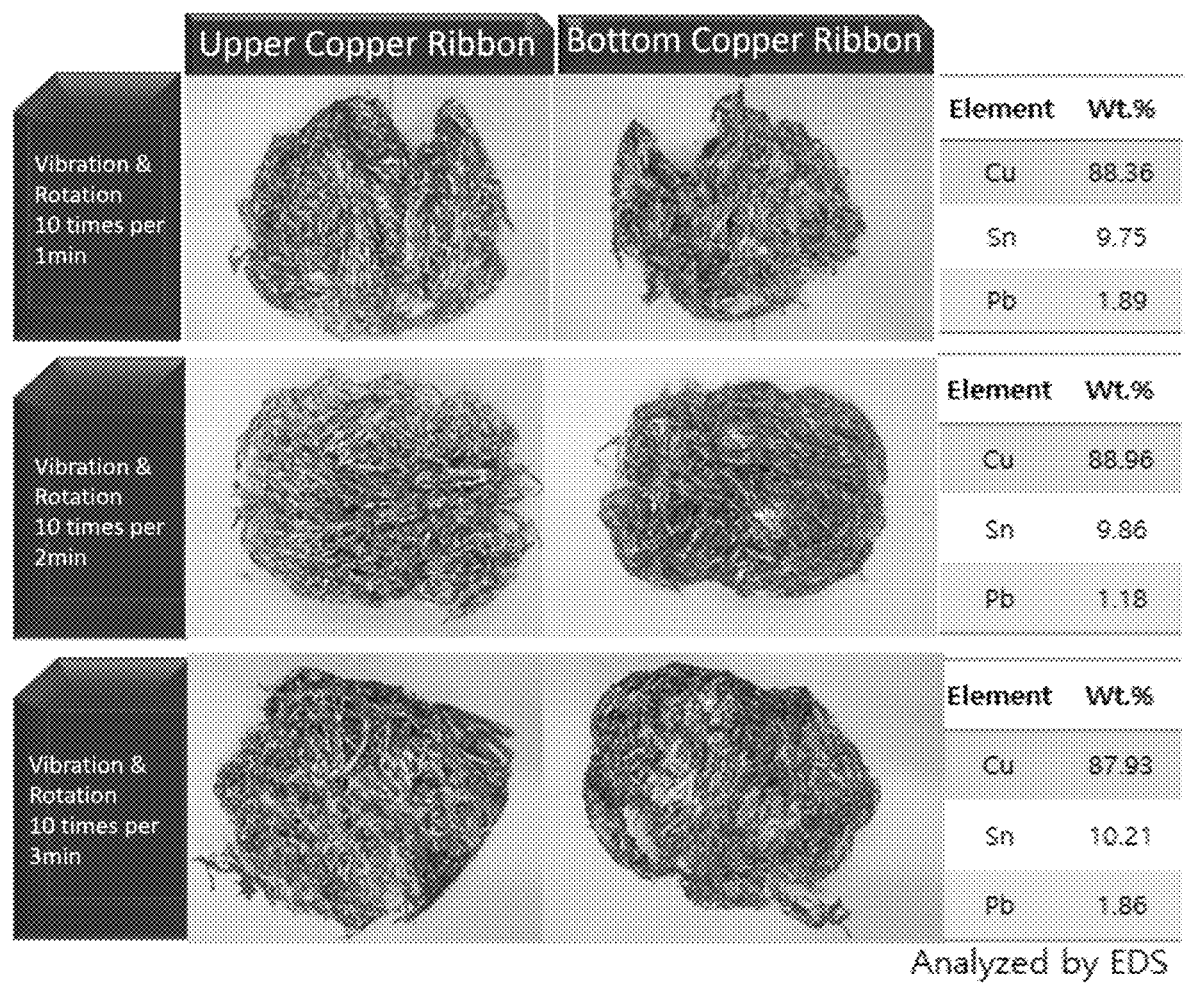
FIG. 3 is a photograph showing a copper ribbon of each of present example 1-1 to present example 1-3 of the present disclosure and a diagram showing a copper purity measurement result of the copper ribbon thereof.
Figure 4:
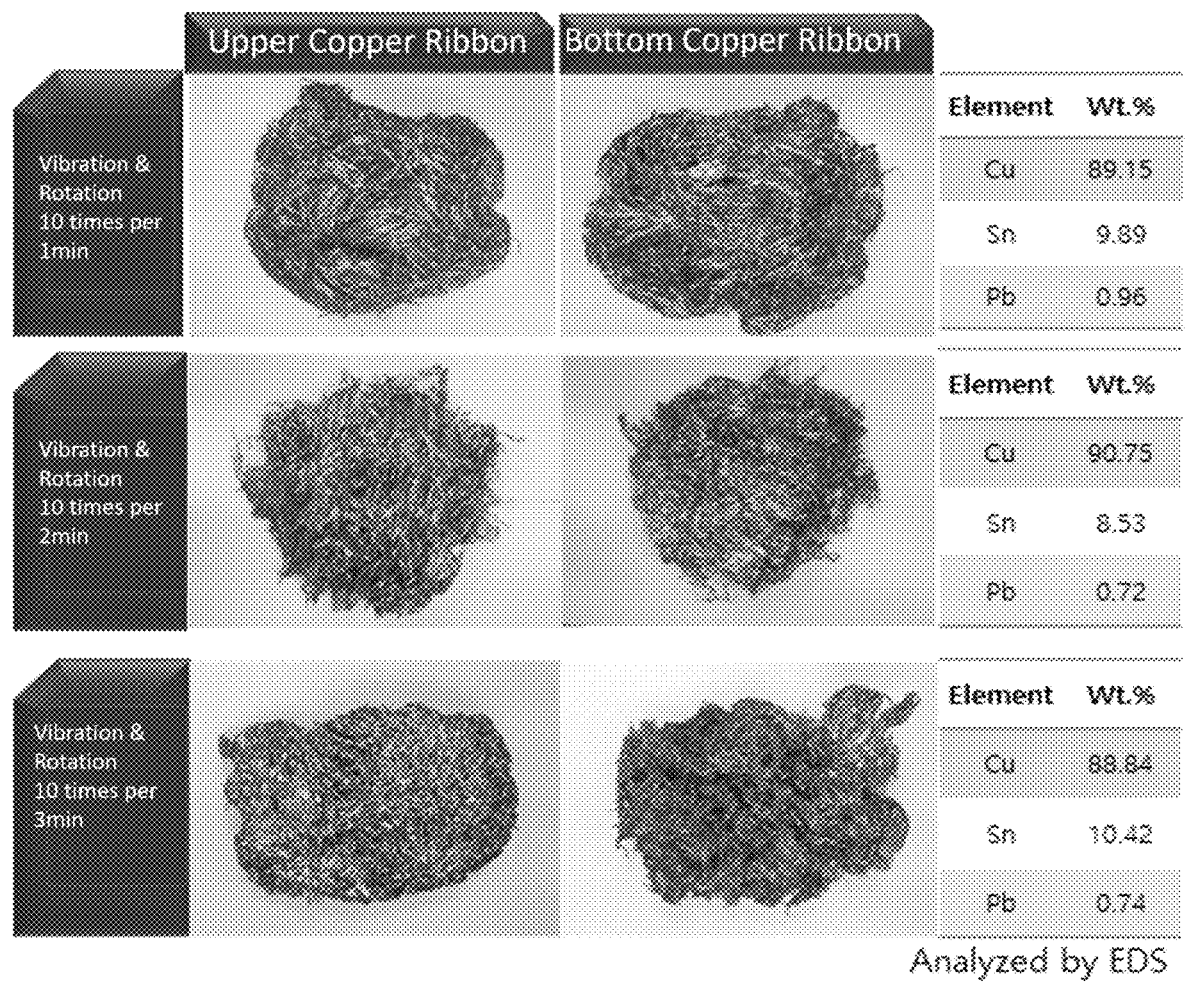
FIG. 4 is a photograph showing a copper ribbon of each of present example 2-1 to present example 2-3 of the present disclosure and a diagram showing a copper purity measurement result of the copper ribbon thereof.
Figure 5:
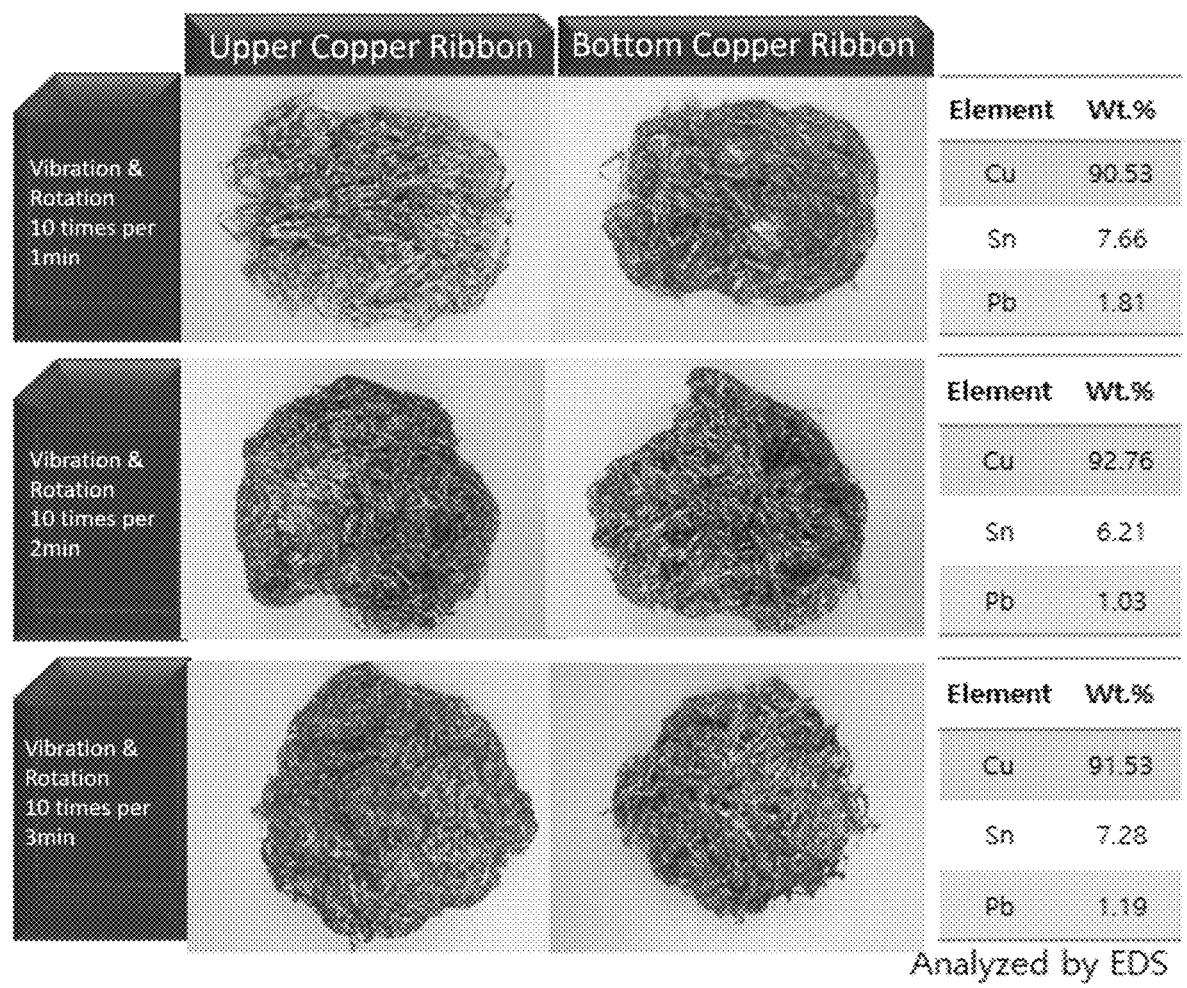
FIG. 5 is a photograph showing a copper ribbon of each of present example 3-1 to present example 3-3 of the present disclosure and a diagram showing a copper purity measurement result of the copper ribbon thereof.

Further, during the heat-treatment, the inertial force and the impact force were applied to the mixture at a rate of 10 times for 1 minute, 10 times for 2 minutes, and 10 times for 3 minutes, respectively. At the same time, the reactor was rotated at the same speed to apply a rotational force thereto. The photograph of the resulting copper ribbon and the copper purity measurement result of the copper ribbon are shown in FIGS. 3 to 5.

Examples according to specific experimental conditions are shown in Table 1 below.

TABLE 1

| 1 hr application | | Temperature condition | | |
|---|---|---|---|---|
| | | 700° C. | 800° C. | 900° C. |
| Inertia force, impact force, and rotational force | 10 times/ 1 min | Present example 1-1 | Present example 2-1 | Present example 3-1 |
| | 10 times/ 2 mins | Present example 1-2 | Present example 2-2 | Present example 3-2 |
| | 10 times/ 3 mins | Present example 1-3 | Present example 2-3 | Present example 3-3 |

Referring to FIG. 3, in the present example 1-1, the copper purity of the copper ribbon was 88.36 wt. %. The copper purity of the copper ribbon was 88.96 wt. % in the present example 1-2. The copper purity of the copper ribbon was 87.93% in the present example 1-3. It could be identified that the effect due to the vibration and rotation was not relatively considerable because the tin oxide of the waste ribbon battery was hardly melted under the temperature condition of 700° C.

In one example, referring to FIG. 4, in the present example 2-1, the copper purity of the copper ribbon was 89.15 wt. %. In the present example 2-1, the copper purity of the copper ribbon was 90.75 wt. %. In the present example 2-3, the copper purity of the copper ribbon was 88.84%. This indicates that the present examples 2-1 to 203 exhibited relatively high copper purity, compared to the present examples 1-1 to 1-3. Further, it was identified that when the inertial force, impact force, and rotational force of 10 times per 2 minutes (present example 2-2) were applied to the waste ribbon battery under the temperature condition of 800° C., the copper purity was the highest, and thus the effect due to the vibration and rotation was the highest.

Referring to FIG. 5, in the present example 3-1 to present example 3-3 having a temperature condition of 900° C., the copper purity of the copper ribbon was 90 wt. % or greater. Thus, the largest amount of the tin oxide of the waste ribbon battery was melted.

Further, it was identified that the highest copper purity was obtained and thus the effect due to the vibration and rotation was the highest when the rotational force and inertia force were applied to the waste ribbon battery 10 times/2 mins under the condition of 900° C. temperature (present example 3-2).

Therefore, the larger amount of the tin oxide melts as the temperature increases. It may be identified that when the inertial force, impact force, and rotational force were applied 10 times per 2 minutes under the same temperature condition, the effect due to the vibration and rotation is the highest.

Experimental Example 2

Figure 6:
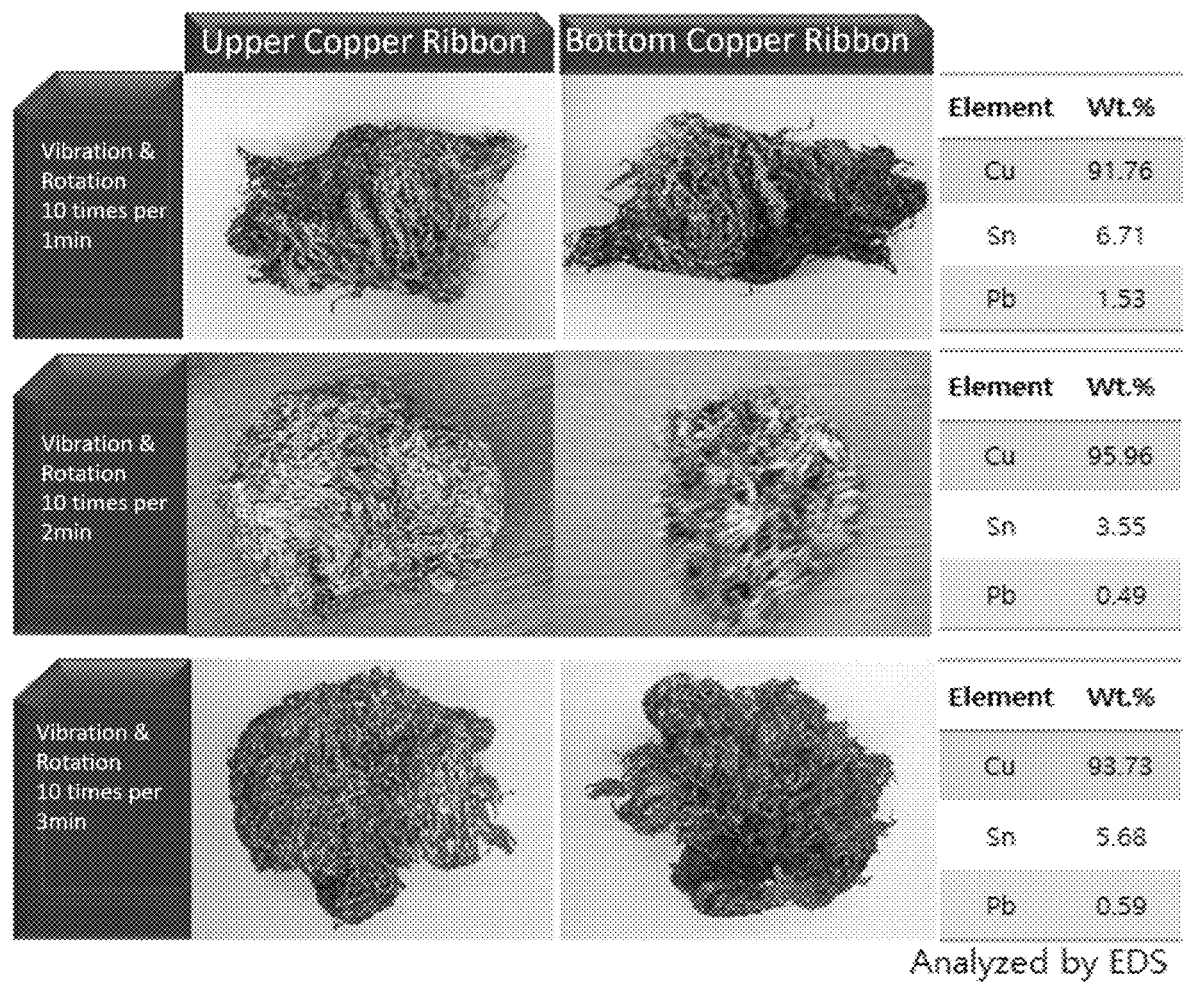
FIG. 6 is a photograph showing a copper ribbon of each of present example 4-1 to present example 4-3 of the present disclosure and a diagram showing a copper purity measurement result of the copper ribbon thereof.
Figure 7:
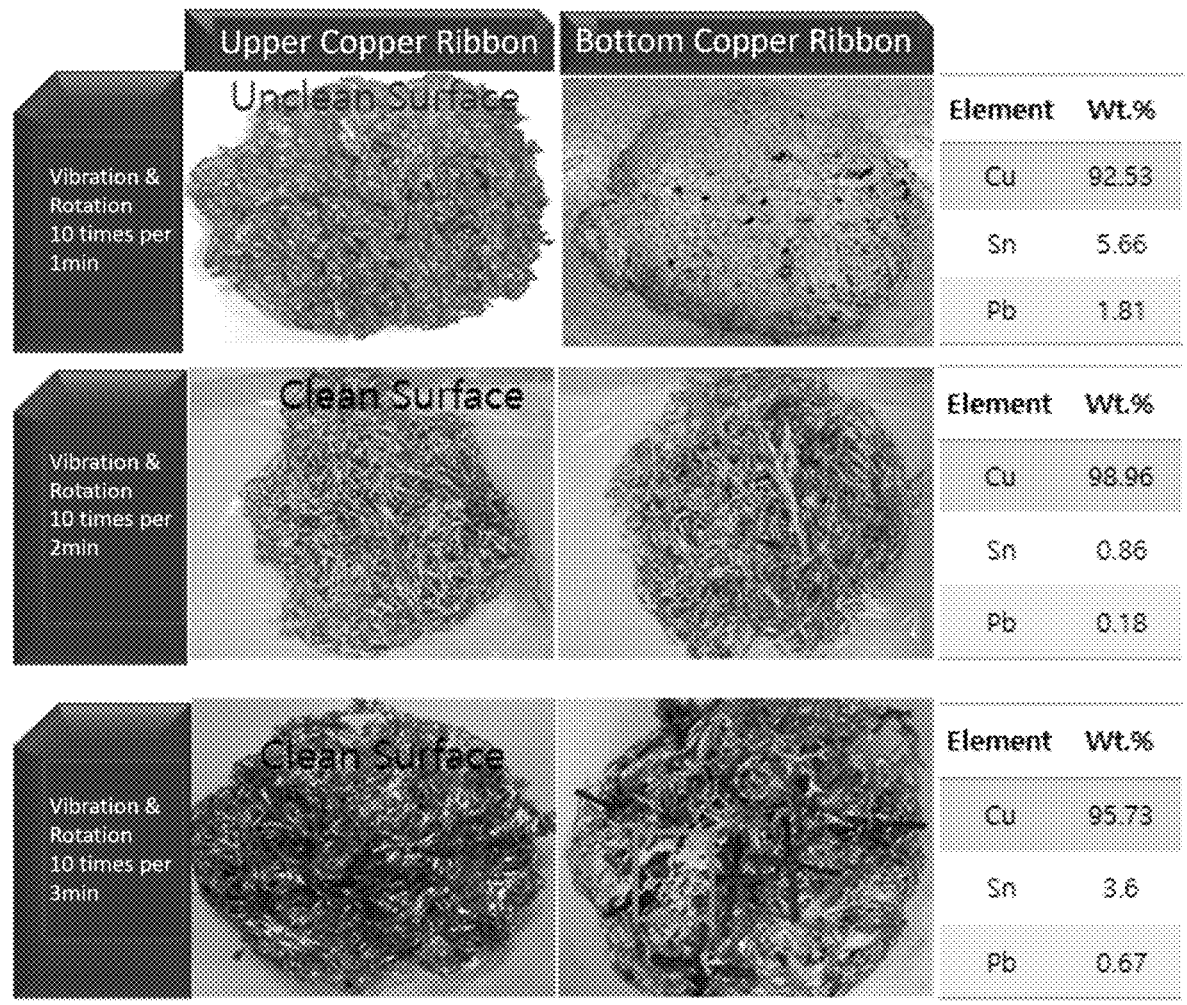
FIG. 7 is a photograph showing a copper ribbon of each of present example 5-1 to present example 5-3 of the present disclosure and a diagram showing a copper purity measurement result of the copper ribbon thereof.

The experiment was performed in the same manner as in Experimental Example 1, except that the temperature condition was fixed to 900° C. and a reaction time was changed to 1 hour, 2 hours and 3 hours. As a result, the photograph of the obtained copper ribbon and the copper purity measurement result of the copper ribbon are shown in FIG. 5 to FIG. 7.

Examples according to specific experimental conditions are shown in Table 2 below.

TABLE 2

| 900° C. | | Reaction time condition | | |
|---|---|---|---|---|
| | | 1 hr | 2 hr | 3 hr |
| Inertia force, impact force, and rotational force | 10 times/ 1 mins | Present example 3-1 | Present example 4-1 | Present example 5-1 |
| | 10 times/ 2 mins | Present example 3-2 | Present example 4-2 | Present example 5-2 |
| | 10 times/ 3 mins | Present example 3-3 | Present example 4-3 | Present example 5-3 |

In the present example 3-1 to present example 3-3, the results are shown in FIG. 5. In the present example 3-1 to present example 3-3, the same results as those of Experimental Example 1 are achieved. Thus, the description thereof is omitted.

Referring to FIG. 6, in the present example 4-1, the copper purity of the copper ribbon was 91.76 wt. %. The copper purity of the copper ribbon was 95.96 wt. % in the present example 4-2. The copper purity of the copper ribbon was 93.73% in the present example 4-3. Thus, the present examples 4-1 to 4-3 exhibited higher copper purity under the same inertial force, impact force and rotational force conditions than those in the present example 3-1 to present example 3-3.

In particular, it was identified that the highest copper purity was achieved in the present example 4-2, and thus the effect due to the vibration and rotation was the highest when the inertial and rotational forces were applied thereto 10 times per 2 minutes.

On the contrary, it was identified that in the present example 4-1, the copper base material and the tin-lead coating layer were compressed according to the vibration and rotation 10 times per minute, resulting in deterioration of purity.

Further, it could be identified that in the example 4-3, the larger amount of the molten tin oxide did not flow down along the mesh structure due to insufficient amount of the vibration and rotation.

In one example, as shown in FIG. 7, in the present example 5-2 in which the vibrations and rotations were applied thereto 10 times per 2 minutes, an appearance of the copper base material was completely exposed, and most of the tin oxide was melted. Thus, it was identified that a content of each of tin and lead was smaller than 1 wt. % when analyzing the copper ribbon.

On the contrary, in the present example 5-1, the purity of the copper ribbon was lowered due to compression resulting from excessive vibration and rotation, compared to the present example 5-2. In the present example 5-3, the molten tin oxide remained in the copper base material due to an insufficient amount of the vibration and rotation as in the present example 4-3.

Therefore, it could be identified that the larger amount of the tin oxide was melted as the temperature increased and the reaction time increased. When the inertial force and rotational force are applied thereto 10 times per 2 minutes under the same temperature condition, the effect due to the vibration and rotation is the highest.

Figure 8:
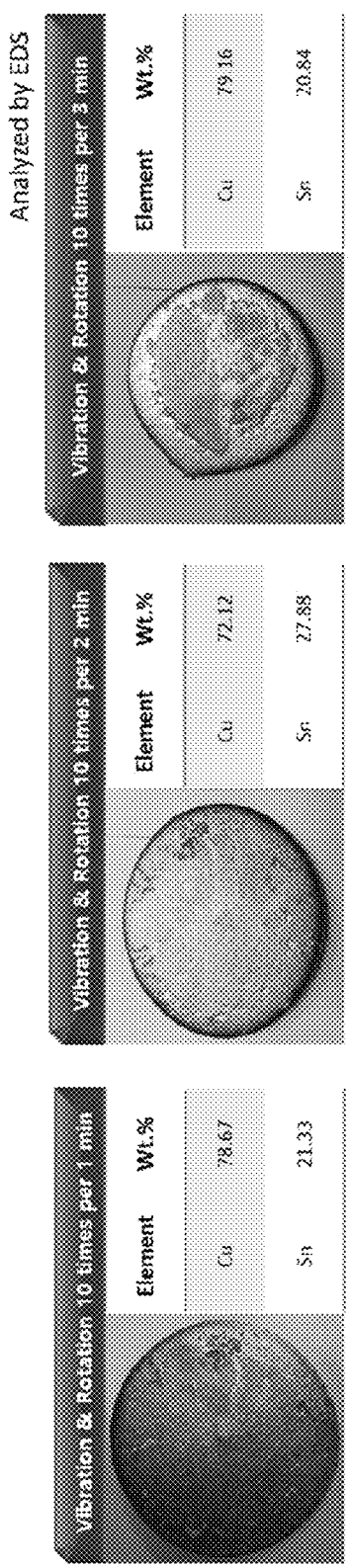
FIG. 8 is a photograph of a copper-tin alloy obtained according to present example 5-1 to present example 5-3 of the present disclosure and a diagram showing copper and tin measurement results of the copper-tin alloy.

In one example, FIG. 8 shows a photograph of a copper-tin alloy obtained according to each of present example 5-1 to present example 5-3 of Experimental Example 2, and the copper and tin measurement result of the copper-tin alloy.

As shown in FIG. 8, it may be identified that the recovery of the copper-tin alloy having a relatively uniform composition is realized regardless of the vibration and rotation conditions of the copper-tin alloy.

Experimental Example 3

The vaporized lead according to the present example 5-2 of Experimental Example 2 was recovered using the recovering line according to the present disclosure, and the finally obtained lead was analyzed using ICP. Further, the photograph of the finally obtained lead and the lead purity result are shown in FIG. 9.

Specifically, the vaporized lead was deposited and recovered using primary and secondary condensers. The undeposited lead was finally recovered using the dust-collector. Then, the lead that was not dust-collected using the dust-collector was recovered using the scrubber. Thus, the lead may not be discharged into the atmosphere.

Figure 9:
FIG. 9 is a photograph of lead finally obtained by recovering vaporized lead through a recovering line according to present example 5-2 of the present disclosure, and a diagram showing a lead purity result.

As shown in FIG. 9, based on a result of ICP analysis, it was identified that the purity of the vaporized lead was 99.9 wt. % and was classified as 3N grade.

The disclosure has been made with reference to the preferred embodiment of the present disclosure. Those skilled in the art will understand that various modifications and changes may be made to the present disclosure without departing from the spirit and scope of the present disclosure set forth in the following claims.

What is claimed is:

1. A method for recovering copper, bronze and lead from a mixture of copper oxide, tin oxide and lead oxide, the method comprising:
    placing a mixture of copper oxide, tin oxide and lead oxide inside a reactor;
    raising a temperature inside the reactor;
    introducing a reducing gas into the reactor and heat-treating the mixture at 700 to 900° C. to separate and recover solid copper and molten bronze; and
    recovering vaporized lead through a recovery line connected to an upper end of the reactor;
    wherein recovering the lead through the recovering line includes:
    cooling and depositing the vaporized lead;
    dust-collecting a portion of lead that is not deposited in the depositing step; and
    recovering a portion of lead that is not collected in the dust-collecting step.

2. The method of claim 1, wherein the reducing gas includes methane gas.

3. The method of claim 1, wherein raising the temperature includes introducing nitrogen or argon gas into the reactor.

4. The method of claim 1, wherein the reactor contains a mesh structure therein, wherein the mixture of copper oxide, tin oxide and lead oxide is placed on a top face of the mesh structure, wherein a recovering unit for recovering molten material is disposed below the mesh structure.

5. The method of claim 4, wherein the molten material includes molten copper-tin alloy.

6. The method of claim 4, wherein in the heat-treatment of the mixture, at least one of an inertial force, an impact force or a rotational force is applied to the mixture or the reactor.

7. The method of claim 6, wherein the at least one of the inertial force, the impact force or the rotational force is applied to the mixture or the reactor 10 times for 1 minute to 3 minutes.

8. The method of claim 1, wherein the cooling and depositing step is performed one or more times.

9. The method of claim 1, wherein the mixture of the copper oxide, tin oxide and lead oxide is obtained by burning a waste solar power module.

10. The method of claim 1, further comprising cooling the lead in a condenser.

\* \* \* \* \*